Figure 1:
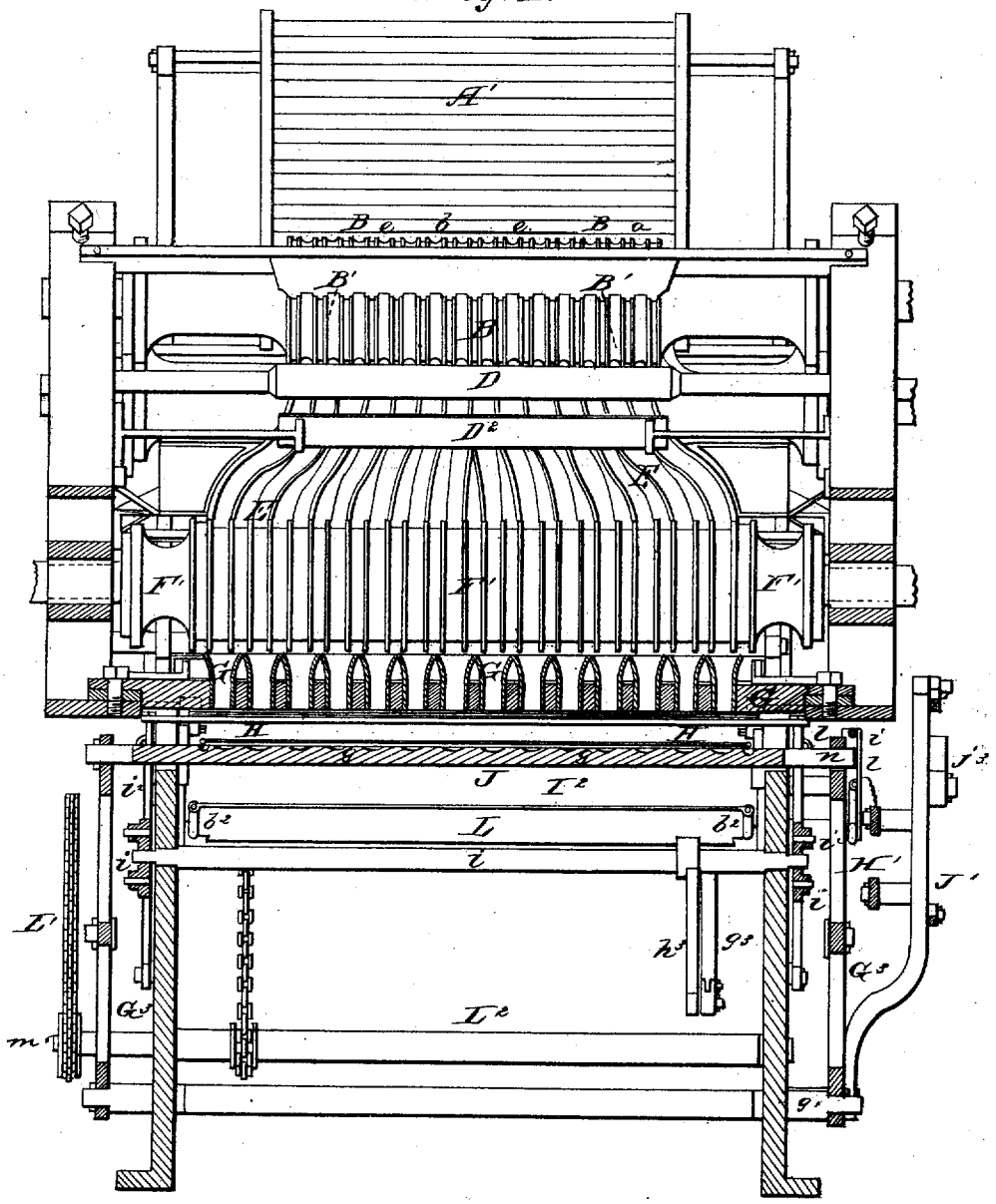

4 Sheets—Sheet 1.

J. FOX.

PROCESS FOR MAKING CRACKERS.

No. 7,231. Reissued July 18, 1876.

Witnesses:

P. C. Dieterich

F. H. Duffy

Inventor:

Joseph Fox

Per: C. H. Watson & Co. Attorneys

N. PETERS, PHOTO-LITHOGRAPHER, WASHINGTON, D. C.

J. FOX.

PROCESS FOR MAKING CRACKERS.

No. 7,231. Reissued July 18, 1873.

Witnesses:

P. C. Dieterich

F. H. Duffy

Inventor:

Joseph Fox

Per: C. H. Wilson & Co Attorneys.

N. PETERS, PHOTO-LITHOGRAPHER, WASHINGTON, D. C.

J. FOX.

PROCESS FOR MAKING CRACKERS.

No. 7,231. Reissued July 18, 1876.

Witnesses:
P. C. Dieterich
F. H. Duffy

Inventor:
Joseph Fox
Per C. H. Watson & Co. Attorneys.

N. PETERS, PHOTO-LITHOGRAPHER, WASHINGTON, D. C.

J. FOX.

PROCESS FOR MAKING CRACKERS.

No. 7,231. Reissued July 18, 1876.

Witnesses:

P. C. Dieterich.

F. H. Duffy.

Inventor:

Joseph Fox

Per: C. H. Watson & Co. Attorneys.

N. PETERS, PHOTO-LITHOGRAPHER, WASHINGTON, D. C.

UNITED STATES PATENT OFFICE.

JOSEPH FOX, OF LANSINGBURG, NEW YORK.

IMPROVEMENT IN PROCESSES FOR MAKING CRACKERS.

Specification forming part of Letters Patent No. 22,793, dated February 1, 1859; reissue No. 3,415, dated May 4, 1869; extended seven years; reissue No. 7,231, dated July 18, 1876; application filed April 8, 1876.

DIVISION B.

*To all whom it may concern:*

Be it known that I, JOSEPH FOX, of Lansingburg, in the county of Rensselaer and State of New York, have invented certain new and useful Improvements in Processes for Manufacturing Crackers; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to a process for manufacturing crackers; and it consists in forming disks or crackers by rolling the dough and forming the same into strips, from which sections or short pieces are separated and pressed endwise to form the disks or crackers by automatic means, as will be hereinafter more fully set forth.

In this specification the term "skin-covered sheet of dough" denotes such a sheet as is made by passing thoroughly-broken cracker-dough through between smooth, plain, rotating rollers until each side of the sheet has the same impermeable surface, glazing or skin that the crackers should have before they are baked; and the words "skin-covered strips of dough" denote a cylindrical or other suitably shaped strip of dough, which is so completely surrounded by smooth skin, which the unbaked crackers should have, that if said strips, when just made, are cut transversely into sections, and these pieces or sections are pressed endwise into the form of disks or crackers, the skin will not be broken or stretched apart by the lateral exp nsion of the dough, but will remain sufficiently intact or impervious to the gases developed in baking all around the symmetrical cracker-shaped pieces thus made.

In carrying out my process certain mechanical means are necessary, and I have, therefore, in the accompanying drawings, illustrated a machine for that purpose.

Figure 2:
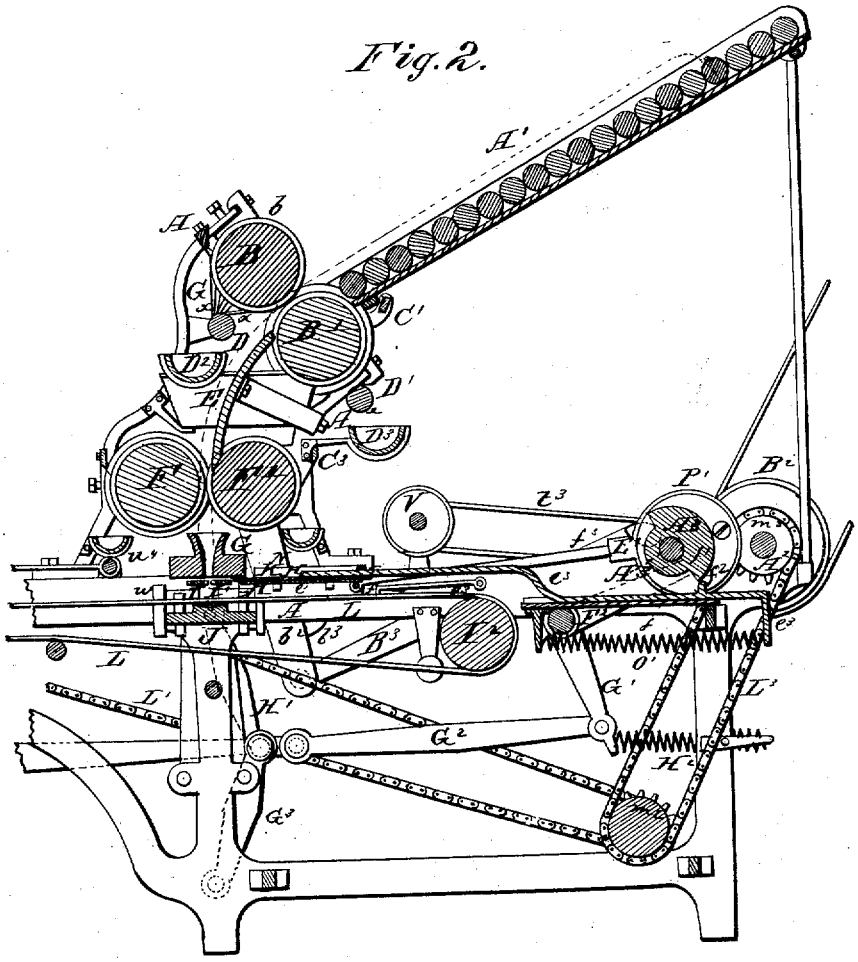
Figure 3:
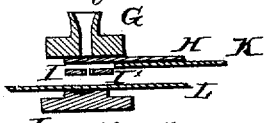
Figure 4:
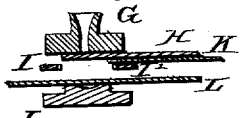
Figure 5:
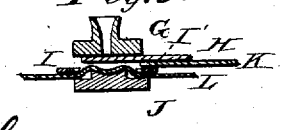
Figure 6:
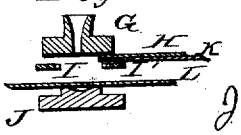
Figure 7:
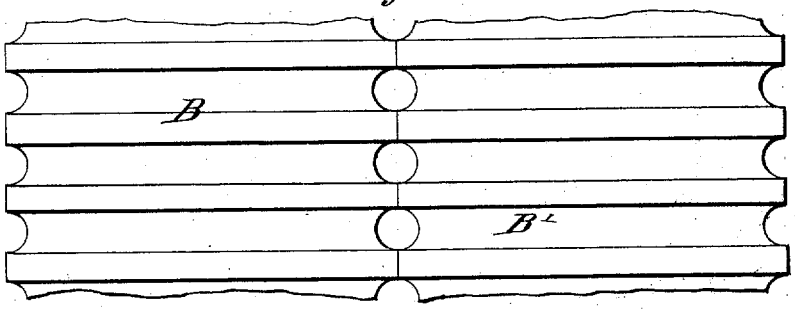
Figure 8:
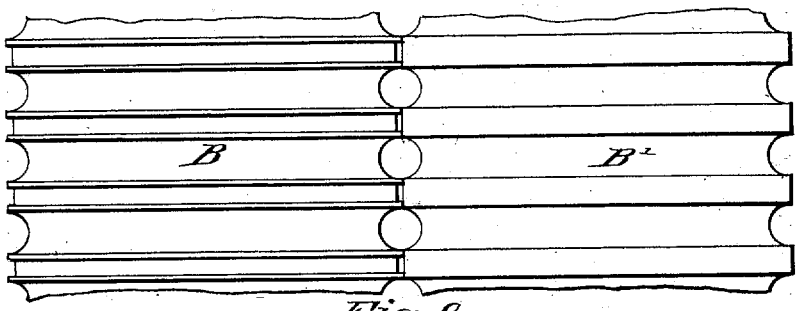
Figure 9:
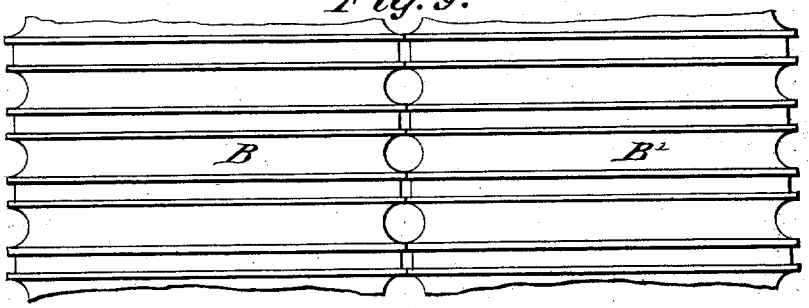
Figure 10:
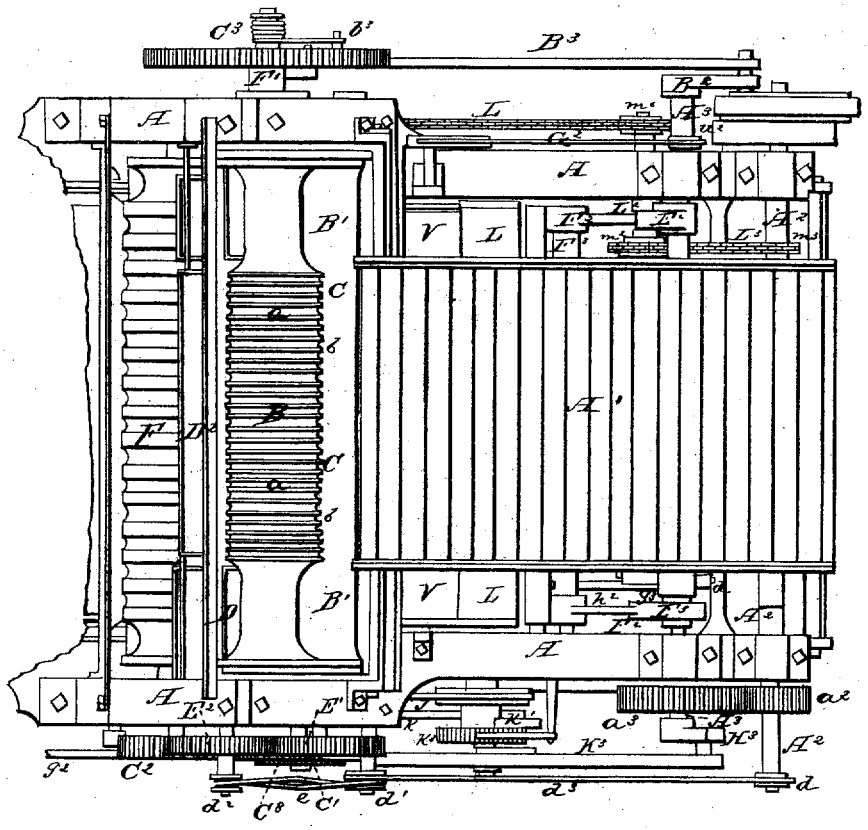

In said drawings, Figure 1 is a transverse vertical section of such machine. Fig. 2 is a longitudinal vertical section of the same. Figs. 3, 4, 5, and 6 are detailed views of parts thereof. Fig. 7 is a view of the roller in ordinary use. Figs. 8 and 9 are enlarged views of my rollers. Fig. 10 is a plan view.

Before the dough is placed in the machine it is rolled to form a skin-covered sheet. This sheet is then passed between grooved rollers having depressed bearings which forms the dough into skin-covered strips of cylindrical form and of any dimensions desired. These strips are then cut into sections or short pieces, which are separated from each other, each section or short piece retaining an unbroken skin or cover around its edge. These sections are then pressed endwise to form the disks or crackers.

In the annexed drawings, B $B^1$ are two rollers grooved transversely to their axis, and arranged and operated together for rolling skin-covered sheets of dough into skin-covered strips fit to be cut into sections, which is done by the edges of the bearings *c* drawing the skin-cover on each side of the sheet toward each other until the edges thereof meet on the sides of the cylindrical strips, where they are united by the pressure of the bearings, which, at the same time, separate the dough between the cylindrical strips therefrom. As the strips leave the rollers B $B^1$ they are spread apart and guided by means of guides E E through rollers F $F^1$, which are also grooved transversely; or, the rollers F $F^1$ may be dispensed with, and the strips driven directly through a bar, G, represented in the detached views. I I′ are clamp-bars, which close upon the strips of the dough a little below the bar G, and then a thin broad blade or knife, H, is driven through the strips of dough close under said bar G, and stops there over the upper ends of the severed pieces or sections. The bar I keeps the pieces from being carried away by the knife as it cuts off said pieces, and the two bars I I′ together keep the pieces from falling over on their sides until a press-plate, J, holds them against the knife H. Just after the knife cuts off the pieces this press-plate J rises automatically and presses the pieces of dough endwise against the knife, the bars I I′ flying open or away from the pieces of dough to allow them to expand sidewise as the press-plate rises to its highest position.

The press-plate has an apron, L, over it, and as it descends a clearer, K, removes the pressed disks or crackers from the under side of the knife and the apron advances carrying them along.

It is, of course, understood that in a machine of this kind the movement of the various parts is not continuous, but is what is known as a step-by-step motion.

The prime motive power of the machine is applied to the shaft $A^2$, which, by means of the pinion $a^2$ and spur-wheel $a^3$, turns the shaft $A^3$. The shaft $A^3$ has a crank, $B^2$, which works the pitman $B^3$ that vibrates the arm $b^3$ that turns the ratchet-wheel $C^3$ fast on the axle of the roller $F^1$, and the roller $F^1$ turns the roller F by the spur-wheels $c^1$ $e^2$, and also turns the rollers B $B^1$ by the pinion $C^3$ and spur-wheels $E^1$ $E^2$, so that every time the shaft $A^3$ makes a revolution the sets of rollers B $B^1$ and F $F^1$ turn one step. When the second set of rollers F $F^1$ are dispensed with, as above stated, the said ratchet-wheel $C^3$ is placed on the axle of the roller $B^1$, which turns the roller B by means of the spur-wheels $F^1$ $F^2$. In other respects the mechanism is the same. Just below the perforated bar G, and parallel with it, is placed the thin knife or blade H. This knife slides in fixed ways $E^1$ $E^2$, and is worked by a rod, $e^3$, that slides in the guide $f$ past the shaft $A^3$. The cam $f^1$ on the shaft $A^3$ strikes against the projection $f^2$ on the rod $e^3$, and thereby draws back the knife H just before the rollers B $B^1$ begin a step, and retains it until those rollers turn a step, and until the clamp-bars I I′ come together, when the said cam $f^1$ leaves the said projection $f^2$, and spring $O^1$ drives the knife swiftly through the strips of dough. Under the said knife H, and parallel with the same, I place the clearer K for the purpose of removing the pressed crackers which may adhere to the knife. This clearer is worked by the shaft $a^3$ by means of the eccentric P′ connected with the clearer by the rod $f^3$. Below the knife and clearer are the clamp-bars I I′, which inclose or hold the short sections or pellets of dough at the moment when they are severed from strips by the action of the knife H, as aforesaid, and which separate and leave the sections so severed as soon as they are cut off by said knife. Under the perforated bar G, and parallel therewith, is the press-plate J, which is so arranged that after the short sections of dough are cut from the strips, and while they are held by the clamp-bars I I′, it will rise up and flatten the sections of dough.

Having thus fully described my invention, what I claim as new, and desire to secure by Letters Patent, is—

The process of forming disks or crackers by passing the dough between grooved rollers to form the same into strips, cutting the strips into sections by an automatic knife, and pressing the sections endwise by automatic means, substantially as and for the purpose set forth.

In testimony that I claim the foregoing I have hereunto set my hand.

JOSEPH FOX.

Witnesses:

EUGENE HYATT,
JAMES E. BUELL.